United States Patent

Holzer et al.

[11] Patent Number: 5,720,578
[45] Date of Patent: Feb. 24, 1998

[54] OXIDATIVE CLEANING PROCESS OF CONTAMINATED SLURRIES OR SLURRIED EARTH

[75] Inventors: Klaus Holzer; Otto Horak, both of Leverkusen; Thomas Melin, Köln, all of Germany

[73] Assignee: Bayer Aktiengesellschaft, Leverkusen, Germany

[21] Appl. No.: 663,095

[22] PCT Filed: Dec. 23, 1994

[86] PCT No.: PCT/EP94/04300

§ 371 Date: Jul. 1, 1996

§ 102(e) Date: Jul. 1, 1996

[87] PCT Pub. No.: WO95/18687

PCT Pub. Date: Jul. 13, 1995

[30] Foreign Application Priority Data

Jan. 7, 1994 [DE] Germany .................. 44 00 242.4

[51] Int. Cl.⁶ .................. A62D 3/00; B09C 1/08
[52] U.S. Cl. .................. 405/128; 210/721; 210/762; 210/912; 588/224
[58] Field of Search .................. 405/128; 210/710, 210/721, 724, 761, 762, 912; 47/DIG. 10; 588/205, 223, 224

[56] References Cited

U.S. PATENT DOCUMENTS

| | | | |
|---|---|---|---|
| 4,124,505 | 11/1978 | Horak et al. | 210/762 |
| 4,525,283 | 6/1985 | Horak et al. | 210/762 |
| 4,977,839 | 12/1990 | Fochtman et al. | 110/346 |
| 5,051,191 | 9/1991 | Rasmussen et al. | 210/721 |
| 5,053,142 | 10/1991 | Sorensen et al. | 210/762 X |
| 5,370,801 | 12/1994 | Sorensen et al. | 210/761 X |
| 5,552,051 | 9/1996 | Wang et al. | 210/604 |

FOREIGN PATENT DOCUMENTS

| | | |
|---|---|---|
| 0284754 | 10/1988 | European Pat. Off. . |
| 2555536 | 6/1977 | Germany . |
| 3316265 | 2/1984 | Germany . |
| 4027223 | 2/1992 | Germany . |
| 8806144 | 8/1988 | WIPO . |

*Primary Examiner*—George A. Suchfield
*Attorney, Agent, or Firm*—Sprung Kramer Schaefer & Briscoe

[57] ABSTRACT

In the process for treating contaminated mud or suspended earth, the mud or the suspended earth in concentrations of 3% to 25% dry matter is wet-oxidized by addition of pure oxygen or an oxygen-containing gas at a temperature of 120° C. to 220° C., under a pressure of 3 bar to 50 bar and at pH values <7. To accelerate the oxidation reaction, iron ions alone or in combination with quinones or quinone-forming substances are added to the mud or to the suspended earth.

6 Claims, 1 Drawing Sheet

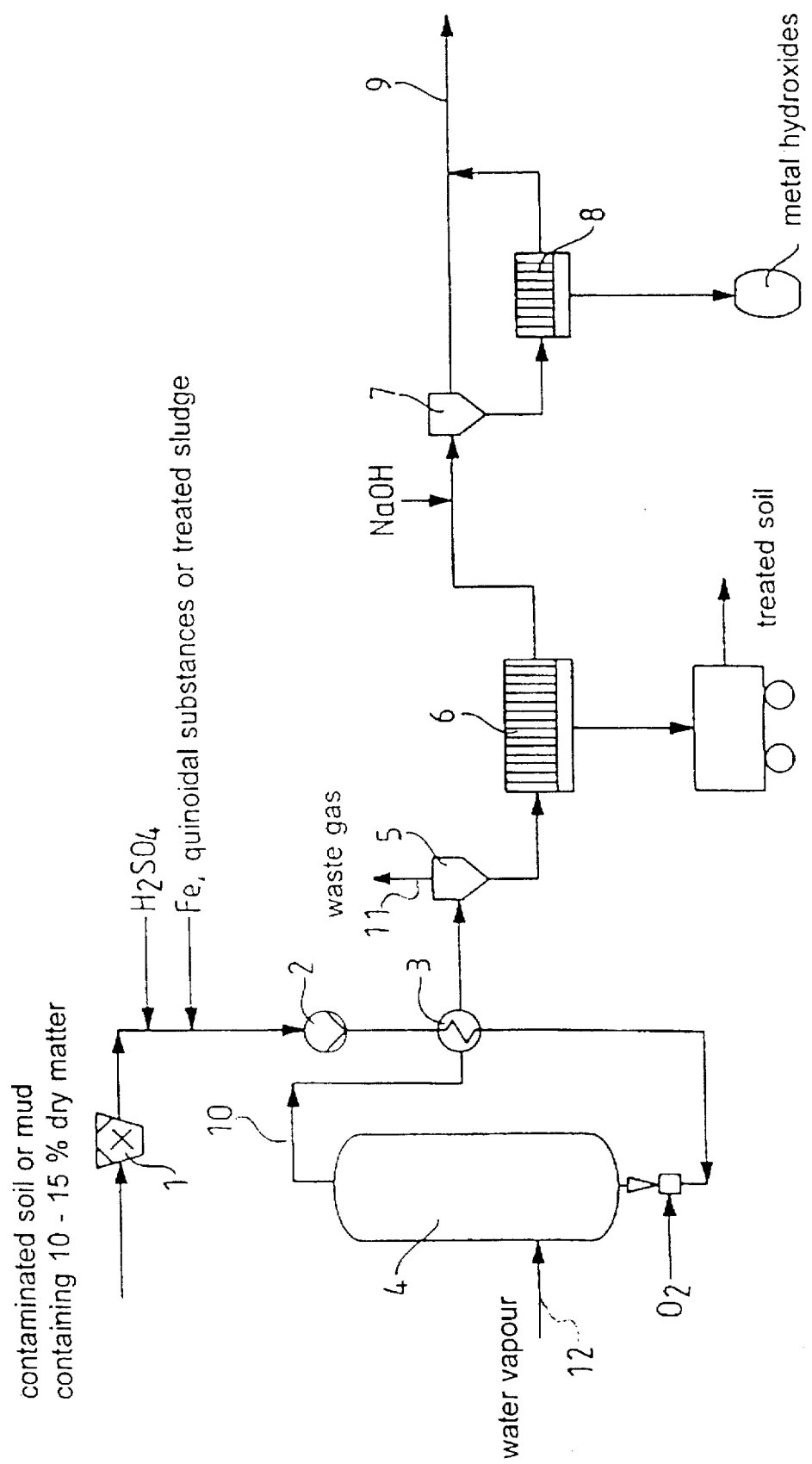

1

OXIDATIVE CLEANING PROCESS OF CONTAMINATED SLURRIES OR SLURRIED EARTH

BACKGROUND OF THE INVENTION

This invention relates to a process for the treatment of contaminated mud or suspended soil. One of the most commonly and successfully used processes for treating contaminated soils is washing. One such process is described, for example, by E. Hilmer and E. Schramm in the journal "Altlasten" 1/92, pages 32 to 34. In this process, the material to be treated, generally earth mixed with sand or gravel, is subjected to intensive multistage washing with high-pressure water jets. Irrespective of the washing process itself, the waste-water contains co-called "fine silt" in addition to the soil contaminants dissolved in the water. Fine silt is understood to be the fine-particle component of the soil with a particle size of less than 0.5 mm. However, experience has shown that this fine component contains most of the organic soil contaminants (hydrocarbons, polycyclic aromatic hydrocarbons (PAHC's) or chlorinated hydrocarbons (CHC's), etc.,) which are not destroyed by the soil washing process.

Another serious problem is the decontamination or treatment of contaminated dredger muds. Ports in particular are confronted by the problem of disposing of dredger muds which are often contaminated with organic contaminants and also with heavy metals. The solids are separated according to particle size on board the dredger itself by means of hydrocyclones. In this case, too, most of the contaminants are to be found in the fine component with a particle size below 0.5 mm.

The problem addressed by the present invention was to provide a process for eliminating the contaminants in contaminated soils or muds. More particularly, the invention set out to decontaminate soils or muds contaminated with mineral oil, PAHC's, PCB's and residues of plant protection agents.

SUMMARY OF THE INVENTION

According to the invention, the solution to this problem is characterized in that the contaminated mud or the suspended earth emanating from the soil to be decontaminated with a concentration of 3% to 25% dry matter and preferably 10% to 15% dry matter is wet-oxidized by addition of pure oxygen or an oxygen-containing gas at a temperature of 80° C. to 330° C. and preferably at a temperature of 120° C. to 220° C., under a pressure of 1 bar to 200 bar and preferably under a pressure of 3 bar to 50 bar and at a pH value below 7, iron ions alone or in combination with quinones or quinone-forming substances being added to the mud or to the suspended earth to accelerate the oxidation reaction.

It has also been found that, instead of quinones, surplus sludge or digested sludge from a biological sewage treatment plant may be added to the quinones as co-catalyst to accelerate the reaction.

If the soil or mud to be treated contains coarse particles, it is best wet-ground to particle sizes below 500 μm and preferably to particles below 100 μm.

In a further development of the process according to the invention, the heavy metals which may have passed into solution in an acidic oxidation reaction are precipitated as hydroxides by addition of alkali after separation of the oxidatively treated solids and are subsequently filtered off.

The invention affords the following advantages: the oxidation reaction can be carried out under relatively mild conditions at temperatures below 220° C. and under pressures below 50 bar. This reduces the strain on materials, lowers costs and increases the safety of the process.

BRIEF DESCRIPTION OF THE DRAWING

The FIGURE is a flowchart showing the process of the invention.

DESCRIPTION OF THE PREFERRED EMBODIMENTS

The invention is described in more detail in the following with reference to a flow chart and is illustrated by Examples.

In the application of the process according to the invention for the oxidative treatment of contaminated soils or muds on an industrial scale, the suspended soil or the mud with a solids content of around 10% to 15% dry matter is first homogenized to particle sizes below 0.2 mm in a wet grinding unit 1. Thereafter the mud can still readily be pumped, even with a dry matter content of 15%. After acidification of the suspension with $H_2SO_4$, iron ions, preferably in the form of $FeSO_4$, and quinones or quinoidal substances are added as catalysts. Instead of the expensive quinones, however, treated sludge from biological sewage treatment plants, for example surplus sludge or digested sludge, may be added as co-catalyst. This mixture is brought to a process pressure of at most 20 bar by a pump 2, heated in a countercurrent heat exchanger 3 and then delivered to an oxidation reactor 4. The reactor is in the form of a bubble column into which pure oxygen is introduced in the form of fine bubbles through injectors at the bottom of the column. Water vapor 12 can also be introduced into the reactor. The oxidation reaction in the reactor takes place at a temperature of 160° C. to 200° C. over a residence time of 2 to 3 hours. The organic constituents of the mud and also the organic pollutants in the mud are oxidized to $CO_2$ and $H_2O$.

The oxidation reaction is exothermic, i.e. heat is generated during the reaction. A degradation of only 3 to 4 g TOC/l is sufficient to allow the reaction to take place autothermally. If sufficient carbon is present in the mud, no further heat need be applied after the first heating of the reactor. The treated mud flows from the head of the column (oxidation pipe 10) to the counter-current heat exchanger 3 where it is cooled. The cooled suspension is then degassed and relieved of pressure in the cyclone 5. A small quantity of waste gas 11 which contains CO in addition to $CO_2$ is formed and is delivered to a combustion unit for aftertreatment.

The oxidized and degassed mud is freed from water in a filter press 6 or a decanter. Since the mud now consists predominantly of inorganic components, it is easy to dewater (to a dry matter content of >50%) and may then be disposed of as waste.

Where the oxidation reaction is carried out at an acidic pH, various inorganic pollutants, more particularly heavy metals, can pass into solution where they are present in the soil or mud to be treated. If the waste-water freed from solids coming from the filter press 6 is alkalized by addition of alkali, for example NaOH, these dissolved pollutants are converted into hydroxides. The hydroxides may then be precipitated and separated in a sedimentation vessel 7. The metal hydroxides may then be dewatered in a following filter press 8 and separately disposed of. The wastewater freed from inorganic pollutants, including heavy metals, only contains readily biodegradable residues and may be introduced through the wastewater pipe 9 into a conventional biological sewage treatment plant for final purification.

EXAMPLE 1

A mud containing around 5 to 7% solids with a particle size below 1 mm was formed in a conventional soil washing process. The mud was contaminated with polycyclic aromatic hydrocarbons (PAHC's) in a total concentration of 917 mg/kg solids. The concentration of the individual components is shown in column 2 of Table 1.

A three-hour treatment at 190° C./pH 2 by the process described above produced a reduction in the PAHC's to <9 mg/kg. This means more than 99% were oxidatively degraded. The individual analysis values in column 3 of Table 1 show that most of the PAHC pollutants were eliminated to below the detection limit. The elimination rate for the individual PAHC components is shown in column 4.

EXAMPLE 2

To demonstrate another application, a PAHC-contaminated dredger mud with a solids content of 10% to 15% and an average particle size of less than 0.5 mm was treated by the process according to the invention. The reaction was again carried out at 190° C., under a pressure of 20 bar and over a residence time of 3 hours at pH 2. Iron and quinones were added as catalysts. The results are set out in Table 2. Column 1 again shows the PAHC components, column 2 their entry concentration and column 3 the exit concentration after oxidation. Of the total PAHC contamination corresponding to 1213.7 mg/kg solids, more than 99.7% was oxidized. Most of the PAHC components were reduced to below the detection limit. Other hydrocarbons, for example mineral oils, were also more than 99% degraded.

TABLE 1

PAHC's in the solids (<1 mm) from soil washing before and after oxidative degradation

| | Entry | After-treatment | % Elimination |
|---|---|---|---|
| Naphthalene | 59.3 | 3.3 | 94.4 |
| Acenaphthylene | <0.1 | <0.1 | — |
| Acenaphthene | 36.1 | <0.1 | 99.7 |
| Fluorine | 19.1 | <0.1 | 99.4 |
| Phenanthrene | 106 | 1.6 | 99.5 |
| Anthracene | 28 | 0.1 | 99.6 |
| Fluoranthene | 223 | 1.4 | 99.4 |
| Pyrene | 102 | 0.5 | 99.5 |
| Benz[a]anthracene | 101 | 0.3 | 99.7 |
| Chrysene | 53.1 | 0.5 | 99.1 |
| Benzo[b]fluoroanthene | 50.7 | 0.6 | 98.8 |
| Benzo[k]fluoroanthene | 22 | <0.1 | 99.5 |
| Benz[a]pyrene | 46.4 | <0.1 | 99.8 |
| Dibenz[ah]anthracene | 7.1 | <0.1 | 98.6 |
| Benzo[ghi]perylene | 29.6 | <0.1 | 99.7 |
| Indeno[1.2.3.cd]pyrene | 33.3 | <0.1 | 99.7 |
| Total | 916.8 | 9.1 | >99% |

Quantities in [mg/kg]

TABLE 2

PAHC's in the solids (<0.5 mm) of a contaminated dredger mud before and after oxidative degradation

| | Entry mg/kg | Aftertreatment mg/kg |
|---|---|---|
| Naphthalene | 1.1 | <0.2 |
| Acenaphthylene | n.d. | n.d. |
| Acenaphthene | 44 | 0.3 |
| Fluorine | 11 | <0.2 |
| Phenanthrene | 98 | 0.6 |
| Anthracene | 44 | <0.2 |
| Fluoranthene | 200 | <0.2 |
| Pyrene | 162 | 0.2 |
| Benz[a]anthracene | 108 | <0.2 |
| Chrysene | 122 | <0.2 |
| Benzo[b]fluoroanthene | 108 | <0.2 |
| Benzo[k]fluoroanthene | 44 | <0.2 |
| Benz[a]pyrene | 112 | <0.2 |
| Dibenz[ah]anthracene | 19.6 | <0.2 |
| Benzo[ghi]perylene | 66 | <0.2 |
| Indeno[1.2.3.cd]pyrene | 74 | <3.5 |
| Total | 1213.7 | <3.5 |

PAHC elimination >99.7%

We claim:

1. A process for the treatment of contaminated mud or suspended earth which comprises wet-oxidizing the mud or the suspended earth in concentrations of 3 to 25% dry matter by addition of pure oxygen or an oxygen-containing gas at a temperature of 120° C. to 220° C., under a pressure of 3 bar to 50 bar and at pH values of <7 in the presence of iron ions alone or in combination with quinones or quinone-forming substances which are added to the mud or the suspended earth to accelerate the oxidation reaction.

2. A process as claimed in claim 1, wherein in addition to or in place of the quinone there is added surplus sludge or digested sludge from a biological sewage treatment plant as (co)-catalyst to the mud or the suspended earth.

3. A process as claimed in claim 1, wherein the suspended earth or the mud is mechanically size-reduced to particle sizes of <500 μm.

4. A process as claimed in claim 1, wherein the heavy metals which have passed into solution in the acidic oxidation reaction are precipitated as hydroxides by the addition of alkali after removal of the oxidatively purified solids and are filtered off.

5. A process as claimed in claim 1, wherein the mud or suspended earth contains from 10 to 15% dry matter.

6. A process as claimed in claim 3, wherein the particle size is <100 μm.

* * * * *